(12) United States Patent
Ito et al.

(10) Patent No.: US 11,421,404 B2
(45) Date of Patent: Aug. 23, 2022

(54) CONSTRUCTION MACHINE

(71) Applicant: KOBELCO CONSTRUCTION MACHINERY CO., LTD., Hiroshima (JP)

(72) Inventors: Masaru Ito, Hiroshima (JP); Seiji Saiki, Hiroshima (JP); Yoichiro Yamazaki, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 0 days.

(21) Appl. No.: 16/981,949

(22) PCT Filed: Mar. 27, 2019

(86) PCT No.: PCT/JP2019/013304
§ 371 (c)(1),
(2) Date: Sep. 17, 2020

(87) PCT Pub. No.: WO2019/189430
PCT Pub. Date: Oct. 3, 2019

(65) Prior Publication Data
US 2021/0010244 A1    Jan. 14, 2021

(30) Foreign Application Priority Data

Mar. 28, 2018  (JP) .............................. JP2018-061613

(51) Int. Cl.
*E02F 9/26* (2006.01)
*G02B 27/01* (2006.01)
(Continued)

(52) U.S. Cl.
CPC .............. *E02F 9/262* (2013.01); *E02F 9/261* (2013.01); *G02B 27/0172* (2013.01);
(Continued)

(58) Field of Classification Search
CPC . E02F 9/205; E02F 9/261; E02F 9/262; E02F 9/28; E02F 9/30; E02F 9/32;
(Continued)

(56) References Cited

U.S. PATENT DOCUMENTS 5,559,511 A * 9/1996 Ito ..................... G08G 1/096861
340/460
8,731,824 B1 * 5/2014 Alaniz ................... G01C 21/32
701/457
(Continued)

FOREIGN PATENT DOCUMENTS

CN      102348100 A    2/2012
CN      103140378 A    6/2013
(Continued)

OTHER PUBLICATIONS

International Search Report dated Jun. 25, 2019 in PCT/JP2019/013304 filed on Mar. 27, 2019, 2 pages.
(Continued)

*Primary Examiner* — Jason M Mandeville
(74) *Attorney, Agent, or Firm* — Oblon, McClelland, Maier & Neustadt, L.L.P.

(57) ABSTRACT

A construction machine includes a display control section which controls a display device to display attachment relevant information generated based on attachment positional information generated by an attachment positional information generation section and three-dimensional contour information of a peripheral working area around the construction machine. The attachment relevant information is information concerning an image obtained by superimposing a peripheral image about a three-dimensional contour of the peripheral working area and a projected image about a leading end attachment which is projected to the peripheral (Continued)

image in a projection direction set arbitrarily or a projection direction set in accordance with a predetermined condition.

9 Claims, 14 Drawing Sheets

(51) Int. Cl.
 *E02F 9/20* (2006.01)
 *H04N 7/18* (2006.01)
(52) U.S. Cl.
 CPC ........ *E02F 9/205* (2013.01); *G02B 2027/014* (2013.01); *G02B 2027/0141* (2013.01); *G02B 2027/0178* (2013.01); *H04N 7/183* (2013.01)
(58) Field of Classification Search
 CPC ..... E02F 9/325; G02B 27/01; G02B 27/0141; G02B 27/017; G02B 27/0172; G02B 2027/014; G02B 2027/0141; G02B 2027/0178; H04N 7/183
 USPC .......................................................... 345/8
 See application file for complete search history.

(56) References Cited

U.S. PATENT DOCUMENTS

| | | | |
|---|---|---|---|
| 8,918,246 B2 | 12/2014 | Friend | |
| 11,110,915 B2* | 9/2021 | Turner | B60W 30/06 |
| 2014/0099178 A1 | 4/2014 | Nomura et al. | |
| 2014/0188333 A1 | 7/2014 | Friend | |
| 2014/0226024 A1* | 8/2014 | Limbaugh | H04N 5/23216 348/169 |
| 2017/0251180 A1* | 8/2017 | Smolyanskiy | G06T 19/006 |
| 2018/0016771 A1 | 1/2018 | Izumikawa | |
| 2018/0051446 A1 | 2/2018 | Yoshinada et al. | |
| 2018/0371724 A1 | 12/2018 | Ohiwa et al. | |
| 2019/0024347 A1 | 1/2019 | Izumikawa | |
| 2019/0330825 A1* | 10/2019 | Tanimoto | B60K 35/00 |
| 2020/0399869 A1 | 12/2020 | Yoshinada et al. | |

FOREIGN PATENT DOCUMENTS

| | | |
|---|---|---|
| CN | 105604120 A | 5/2016 |
| EP | 3 276 089 A1 | 1/2018 |
| JP | 6-272282 A | 9/1994 |
| JP | 2001-123476 A | 5/2001 |
| JP | 2013-36243 A | 2/2013 |
| JP | 2015-43488 A | 3/2015 |
| JP | 5941663 B2 | 6/2016 |
| JP | 2017-71942 A | 4/2017 |
| WO | WO 2014/054193 A1 | 4/2014 |
| WO | WO 2017/110382 A1 | 6/2017 |
| WO | WO 2017/170382 A1 | 10/2017 |

OTHER PUBLICATIONS

Extended European Search Report dated Mar. 2, 2021 in European Patent Application No. 19777544.8, 8 pages.
Combined Chinese Office Action and Search Report dated Nov. 12, 2021 in corresponding Chinese Patent Application No. 20198002049.8 (with Partial English Translation and English Translation of Category of Cited Documents), 53 pages.

* cited by examiner

CONSTRUCTION MACHINE

TECHNICAL FIELD

The present invention relates to a construction machine.

BACKGROUND ART

There has been known a technology of causing a display device provided in an operating room of a construction machine to display in numerals, together with an attachment, information concerning a distance between a plane (a reference position) where a construction machine locates and a leading end of the attachment (for example, see Patent Literature 1).

Another technology having been known is to cause a transparent display device provided at a front position in an operating room of a construction machine to display, together with an attachment, necessary information for an operator to perform a working (for example, see Patent Literature 2). Specifically, Patent Literature 2 discloses a technology of causing the display device to display the necessary information in characters or colors in juxtaposition with a leading end attachment.

However, the technology disclosed in Patent Literature 1 has a problem that an operator finds it difficult to instinctively grasp a working condition and execute the working in a peripheral working area (working site) having an uneven surface or a slope due to the displaying of the distance information only in the numerals.

Moreover, the technology disclosed in Patent Literature 2 is insufficient in a guidance function of performing a guide of the working to the operator due to the displaying of the necessary information only in the characters or colors in juxtaposition with the leading end attachment.

CITATION LIST

Patent Literature

Patent Literature 1: Japanese Patent Publication No. 5941663

Patent Literature 2: Japanese Unexamined Patent Publication No. 2017-71942

SUMMARY OF INVENTION

An object of the present invention is to provide a construction machine having a guidance function of making it easier for an operator to manipulate an attachment to approach a target position in a peripheral working area (that is a target working site).

Provided is a construction machine provided with an attachment having a leading end attachment, the construction machine including: an attachment state detecting device which detects a state of the attachment; an attachment positional information generation section which generates attachment positional information concerning a position of the attachment based on the state of the attachment detected by the attachment state detecting device; a display device; and a display control section which controls the display device to display attachment relevant information generated based on the attachment positional information generated by the attachment positional information generation section and three-dimensional contour information concerning a three-dimensional contour of a peripheral working area around the construction machine. The attachment relevant information is information concerning an image obtained by superimposing a peripheral image about the three-dimensional contour of the peripheral working area and a projected image about the leading end attachment which is projected to the peripheral image in a projection direction set arbitrarily or a projection direction set in accordance with a predetermined condition.

BRIEF DESCRIPTION OF DRAWINGS

FIG. 3 is a block diagram showing primary functions of the hydraulic excavator shown in

FIG. 1.

DESCRIPTION OF EMBODIMENTS

Hereinafter, embodiments of the present invention will be described with reference to the accompanying drawings. In all the drawings explaining the embodiments of the present invention, elements each having the same function are denoted by the same or relevant reference signs, and thus repetitive explanation therefor is omitted. Furthermore, in the embodiments described below, such repetitive explanation for the same or similar elements is basically avoided except that the explanation is considered particularly necessary.

First Embodiment

Figure 1:
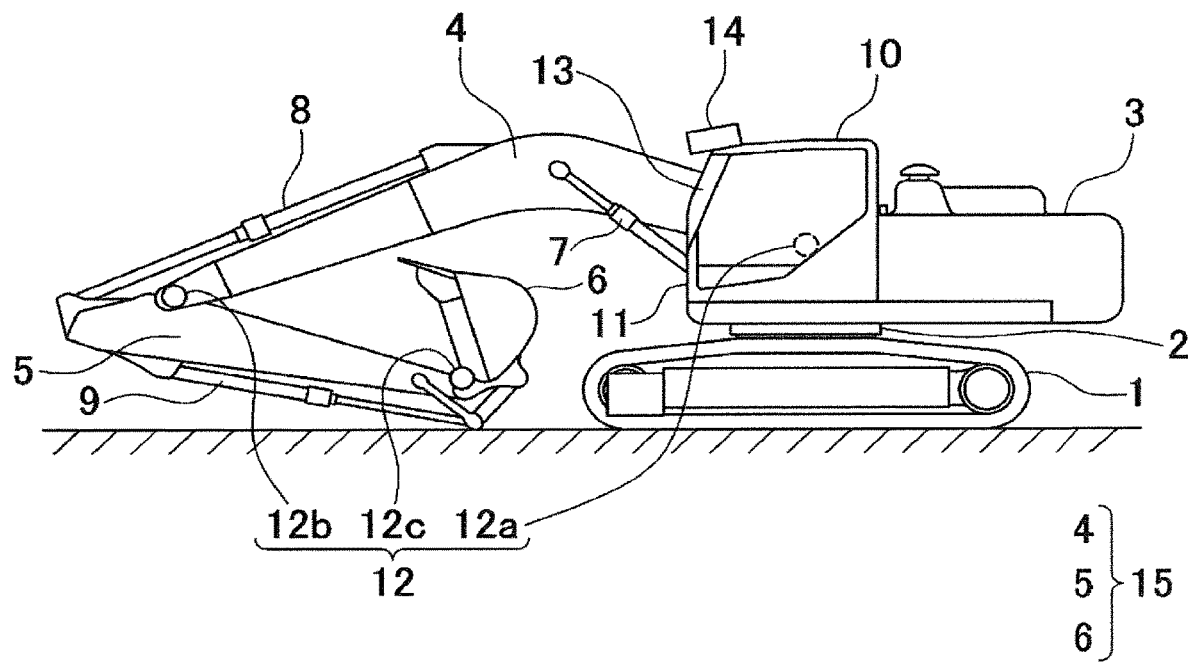
FIG. 1 is a side view of a schematic configuration of a hydraulic excavator serving as a construction machine according to a first embodiment of the present invention.
Figure 2:
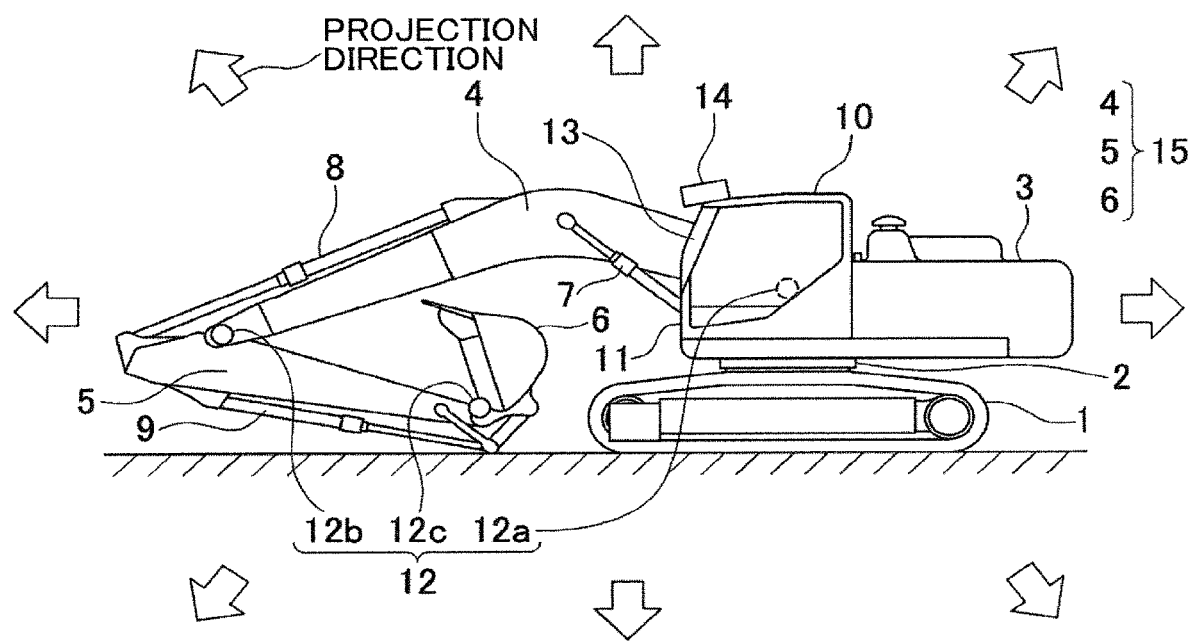
FIG. 2 is an explanatory view explaining a direction in which an attachment of the hydraulic excavator shown in FIG. 1 is projected.
Figure 3:
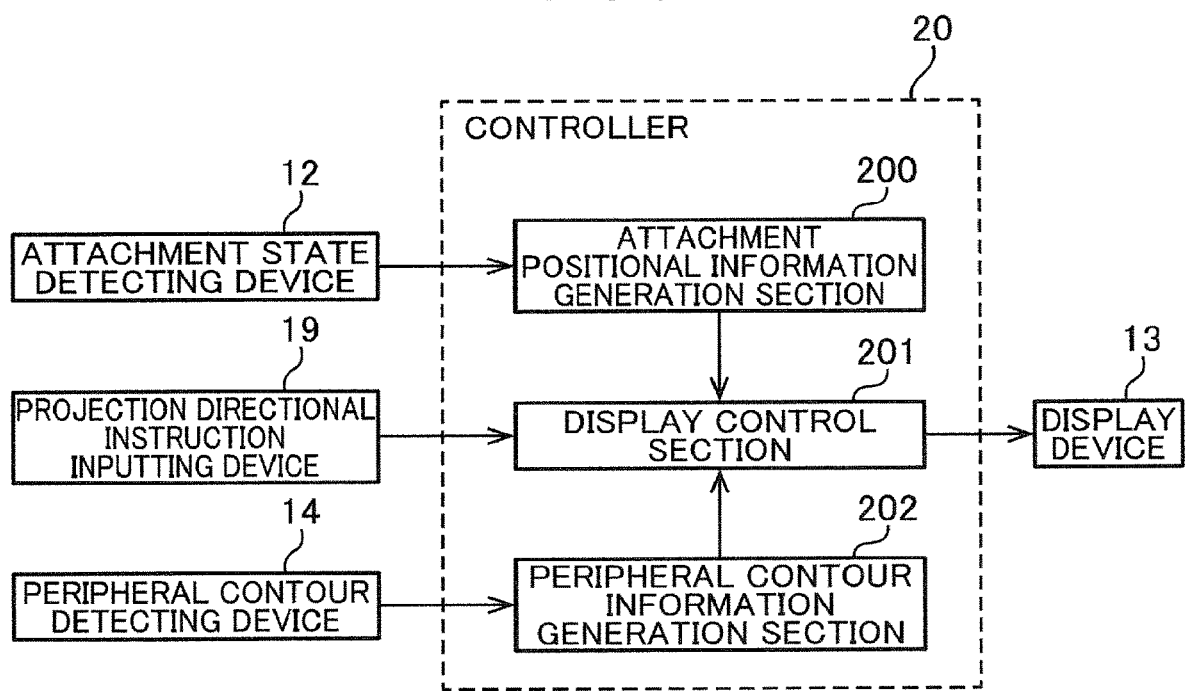
Figure 4:
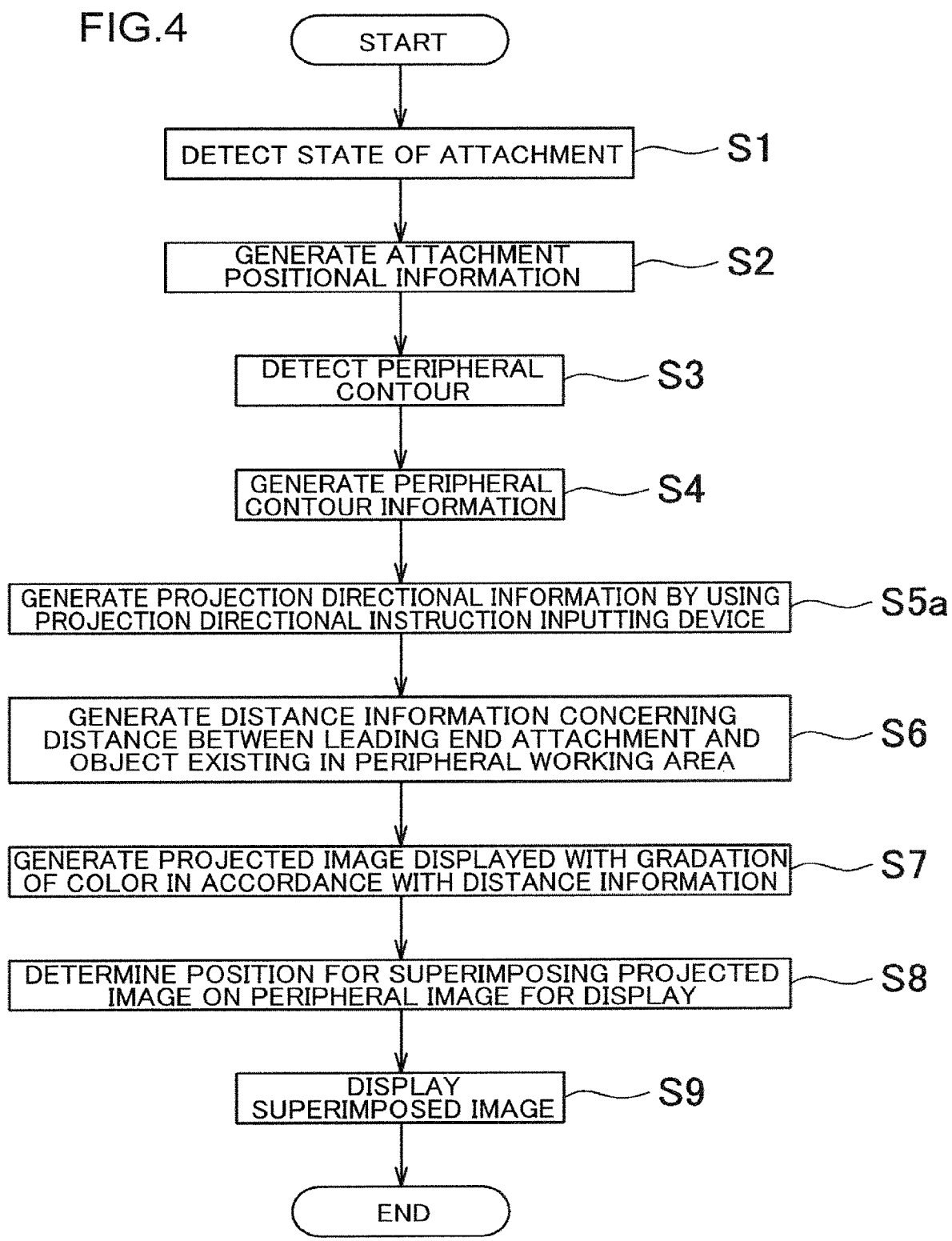
FIG. 4 is a flowchart showing a sequence of a control processing of superimposing a projected image of a leading end attachment (a bucket) on a peripheral image for display.
Figure 5:
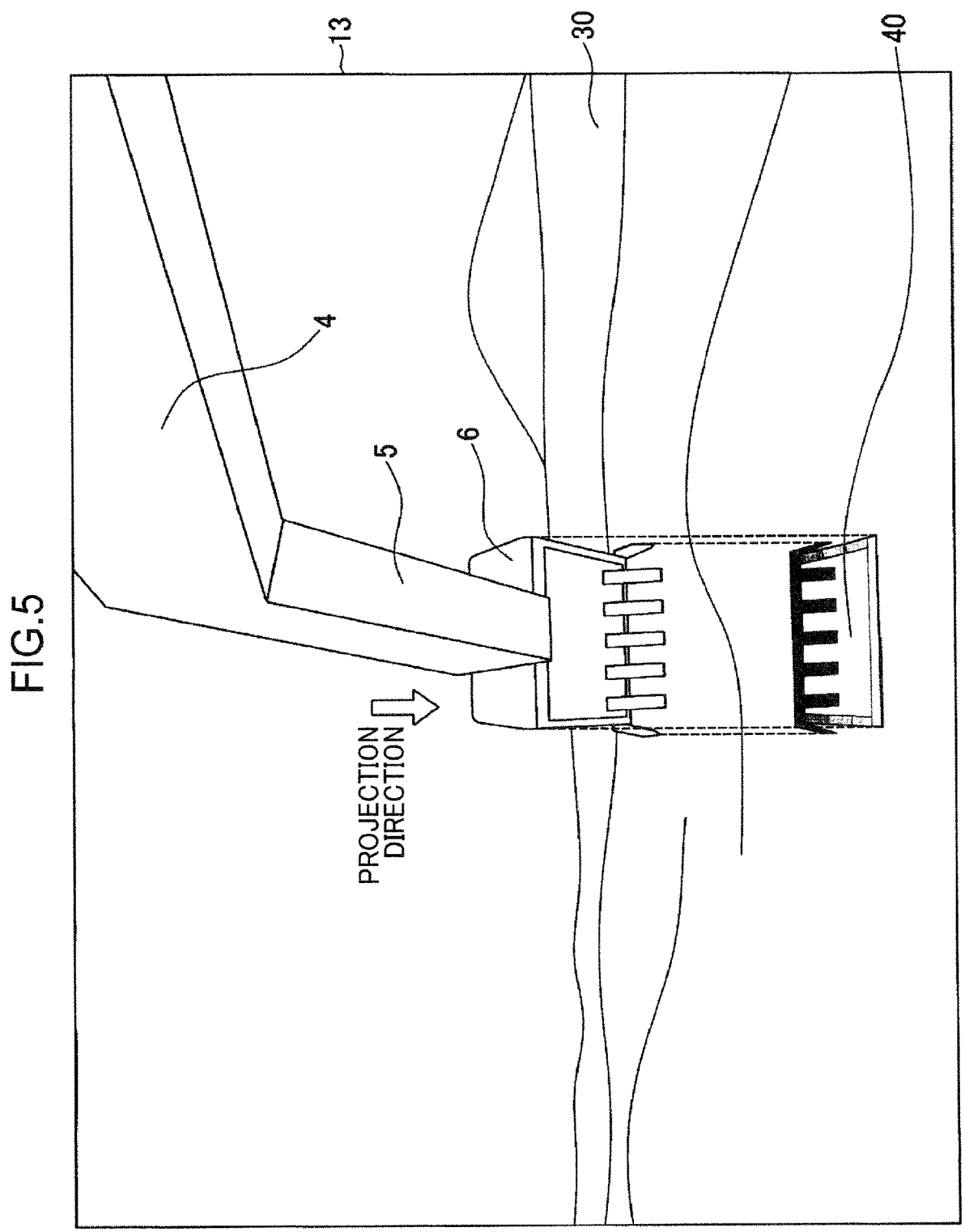
FIG. 5 shows an example of displaying the projected image of the bucket serving as the leading end attachment with a gradation of a color on a screen of a display device in the hydraulic excavator.

FIG. 1 is a side view of a schematic configuration of a hydraulic excavator serving as a construction machine according to a first embodiment of the present invention. FIG. 2 is an explanatory view explaining a direction in which an attachment 15 of the hydraulic excavator shown in FIG. 1 is projected. FIG. 3 is a block diagram showing primary functions of the hydraulic excavator shown in FIG. 1. FIG. 4 is a flowchart showing a sequence of a control processing of superimposing a projected image of a bucket 6 serving as a leading end attachment of the attachment 15 shown in FIG. 1 on a peripheral image for display. FIG. 5 shows an example of displaying the projected image of the bucket 6 serving as the leading end attachment with a gradation of a color on a screen of a display device in the hydraulic excavator.

As shown in FIG. 1, the hydraulic excavator includes a lower traveling body 1, an upper slewing body 3 slewably mounted on the lower traveling body 1, and the attachment 15 mounted to the upper slewing body 3. The upper slewing body 3 is mounted on the lower traveling body 1 via a slewing mechanism 2. The attachment 15 includes a boom 4, an arm 5, the bucket 6 (which is an exemplary leading end attachment). The boom 4 is attached to the upper stewing body 3, the arm 5 is attached to a leading end of the boom 4, and the bucket 6 is attached to a leading end of the arm 5. The boom 4, the arm 5, and the bucket 6 are hydraulically driven by a boom cylinder 7, an arm cylinder 8, and a bucket cylinder 9, respectively. Moreover, the upper slewing body 3 is provided with an operating room 10 and mounted with a power source such as an engine.

The hydraulic excavator further includes an attachment state detecting device 12 which detects a state of the attachment 15 (step S1 shown in FIG. 4). The attachment state detecting device 12 is mounted on, for example, the attachment 15, the upper slewing body 3 or the like.

The attachment state detecting device 12 is, for example, a sensor for acquiring information concerning the state of the attachment 15 of the hydraulic excavator. In this embodiment, the attachment state detecting device 12 has a boom angle sensor 12a for detecting an inclination of the boom 4 with respect to the upper slewing body 3, an arm angle sensor 12b for detecting an inclination of the arm 5 with respect to the boom 4, and a bucket angle sensor 12c for detecting an inclination of the bucket 6 with respect to the arm 5. The attachment state detecting device 12 includes the aforementioned angle sensors in the embodiment, but should not be limited to this configuration. For instance, the attachment state detecting device 12 may be replaced with at least one of six configurations described below. A larger number of elements in combination increases an accuracy of detecting the information concerning the state of the attachment 15 according to the following six configurations:

1. a depth sensor which can acquire a three-dimensional image as well as a distance to a subject (the attachment);
2. a combination of the depth sensor and a gyro sensor provided at a tip end of the bucket 6;
3. a combination of the depth sensor, the gyro sensor, and an AR (Augmented Reality) marker provided at the tip end of the bucket 6, the AR marker indicating an image having a determined pattern to be a mark for designating a position where additional information is displayed in an AR system;
4. a stereo camera;
5. a combination of the stereo camera and the gyro sensor; and
6. a combination of the stereo camera, the gyro sensor, and the AR marker.

As shown in FIGS. 1 and 3, the hydraulic excavator further includes a controller 20, a display device 13, and a peripheral contour detecting device 14. The controller 20 and the display device 13 are arranged, for example, in an inside of the operating room 10. For instance, the peripheral contour detecting device 14 is arranged on a top of the operating room 10.

The peripheral contour detecting device 14 can detect a three-dimensional contour of a peripheral working area in front of the hydraulic excavator (e.g., step S3 shown in FIG. 4). The peripheral working area includes a working target (a working site) around the construction machine. Hereinafter, the three-dimensional contour is also referred to as "peripheral contour".

The display device 13 includes, for example, a transparent head-up display (hereinafter, also referred to as "transparent HUD"). The transparent HUD is provided, for example, on an inner side than a front glass 11 arranged at a front in the operating room 10 (hereinafter, also referred to as "at the front position in the operating room 10"). The transparent HUD that is one example of the display device 13 is not necessarily independent from the front glass 11, but may be integrated with the front glass 11. Alternatively, the display device 13 may include any display other than the transparent HUD.

The peripheral contour detecting device 14 includes, for example, a distance image sensor (a distance image camera) which can acquire a distance image having distance information in each pixel. The distance image sensor includes, for example, a TOF (Time of Flight) type three-dimensional distance image sensor (such as one manufactured by OPTEX) constituted by a high-speed light source of a near infrared light and a CMOS image sensor, and adoptable to detect the three-dimensional contour of the peripheral working area. The peripheral contour detecting device 14 may be any device other than the distance image sensor.

The primary functional blocks shown in FIG. 3 are respectively constituted by the attachment state detecting device 12, the display device 13, the peripheral contour detecting device 14, a projection directional instruction inputting device 19, and the controller 20.

The projection directional instruction inputting device 19 has a function of receiving an input by an operator. Specifically, for example, the projection directional instruction inputting device 19 has a touch panel. The touch panel has a display screen on which a plurality of arrows, e.g., 8 arrows in the embodiment, are superimposed on a side image of the hydraulic excavator for display as shown in FIG. 2, each of the arrows representing a direction (hereinafter, referred to as "projection direction") in which the attachment 15 of the hydraulic excavator is projected. Therefore, the operator can input a desired projection direction by selectively designating (clicking or touching) a corresponding arrow among the plurality of arrows displayed on the display screen. The controller 20 generates projection directional information based on the input information concerning the projection direction input by the operator.

In the embodiment, the projection directional instruction inputting device 19 is independent from the display device 13 as another device, but should not be limited to this configuration. For example, in the case where the display device 13 has the display screen constituted by the touch panel, the display device 13 may have the function of the projection directional instruction inputting device 19 for the input. In this case, the projection directional instruction inputting device 19 is omittable. Furthermore, although the operator selectively inputs the projection direction by hand, and the controller 20 generates the projection directional information based on the input information concerning the input projection direction in the embodiment, the generation way should not be limited thereto. For instance, the controller 20 may automatically generate the projection directional information without any input by the operator, like a second embodiment to be described later.

The controller 20 is, for example, a computer including a CPU, a RAM, a ROM and the like. Specifically, the controller 20 includes an attachment positional information generation section 200, a display control section 201, and a peripheral contour information generation section 202 as functions of the controller 20.

The attachment positional information generation section 200 generates information (attachment positional information) concerning the position of the attachment 15 based on the state of the attachment 15 detected by the attachment state detecting device 12 as in step S2 shown in FIG. 4.

Specifically, in the configuration where the attachment state detecting device 12 includes the boom angle sensor 12*a*, the arm angle sensor 12*b*, and the bucket angle sensor 12*c*, the attachment positional information generation section 200 can calculate a posture of the attachment 15 in accordance with signals detected by the sensors 12*a*, 12*b*, 12*c*. The attachment positional information generation section 200 consequently can calculate the position of the leading end attachment (the bucket 6).

The peripheral contour information generation section 202 generates three-dimensional contour information (peripheral contour information) of the peripheral working area based on the three-dimensional contour (the peripheral contour) of the peripheral working area detected by the peripheral contour detecting device 14 as in step S4 shown in FIG. 4. Specifically, the peripheral contour information generation section 202 can calculate a relative position (coordinates) between the peripheral contour detecting device 14 mounted to the upper slewing body 3 and each of objects existing in the peripheral area. The objects can include, for example, a foundation, a building, another machine, an operator and the like. The hydraulic excavator including the peripheral contour detecting device 14 and the peripheral contour information generation section 202 provides a system which can acquire the peripheral contour information even without storing the peripheral contour information as data in the controller 20 in advance.

The display control section 201 generates attachment relevant information based on the attachment positional information generated by the attachment positional information generation section 200 and the peripheral contour information detected by the peripheral contour detecting device 14, and controls the display device 13 to display the attachment relevant information (step S9 shown in FIG. 4)

A program concerning each of the functional elements, i.e., the attachment positional information generation section 200, the display control section 201, and the peripheral contour information generation section 202, is read from the ROM and loaded to the RAM. The CPU then executes processing for each of the elements.

The attachment relevant information is information concerning an image obtained by superimposing a peripheral image about the three-dimensional contour of the peripheral working area and a projected image about the leading end attachment which is projected to the peripheral image in a projection direction to be described later.

The display control section 201 can calculate a relative position (coordinates) between a position (coordinates) of the leading end of the attachment calculated by the attachment positional information generation section 200 and each of the objects existing in the peripheral area based on the position of the leading end attachment and the relative position (the coordinates), which is calculated by the peripheral contour information generation section 202, between the peripheral contour detecting device 14 and each of the objects existing in the peripheral area. Furthermore, the display control section 201 can generate the peripheral image based on the three-dimensional contour information, and generate the projected image based on the attachment positional information and the three-dimensional contour information. As a result, the display control section 201 can generate the attachment relevant information based on the attachment positional information and the three-dimensional contour information. Here, the display control section 201 can generate an image about the leading end attachment based on shape information concerning a shape of the leading end attachment. The shape information of the leading end attachment is stored in a storage section of the controller 20 in advance.

Consequently, in the embodiment, the attachment relevant information is calculated based on the shape information of the leading end attachment, the attachment positional information, and the three-dimensional contour information.

The projection direction is a direction (arbitrary direction) set arbitrarily or a direction set in accordance with a predetermined condition. The arbitrary direction is set arbitrarily by the operator among various directions in a three-dimensional space. Specifically, the arbitrary direction is set selectively by the operator among the plurality of directions denoted by the corresponding arrows (e.g., 8 arrows in the embodiment) shown in FIG. 2. The direction set in accordance with the predetermined condition is, for example, a direction set by the controller 20 in accordance with the predetermined condition. For instance, the predetermined condition may be set and stored in the controller 20 in advance, or may be set and stored in the controller 20 in accordance with information input by the operator or from various sensors to the controller 20 before or during a working using the hydraulic excavator.

As aforementioned, adoption of the configuration including the display device 13 which displays the attachment relevant information concerning the image obtained by superimposing the projected image on the peripheral image makes it easier for the operator to instinctively grasp approaching of the leading end attachment (e.g., the bucket 6) to a target position in the peripheral working area, specifically, in an uneven land of a working site that is a working target. That is to say, the hydraulic excavator according to the embodiment has a guidance function of facilitating the working for the operator.

As described above, the attachment relevant information is information concerning the image obtained by superimposing the projected image of the leading end attachment (the bucket 6) on the peripheral image about the three-dimensional contour of the peripheral working area. The projected image includes distance information calculated (generated) by the display control section 201 of the controller 20. Further, the display control section 201 can calculate the relative position (the coordinates) between the position of the leading end attachment and each of the objects existing in the peripheral area. As a result, the display control section 201 can generate the distance information based on the calculated relative position. The distance information is information concerning a distance between the bucket 6 and an object which lies in an area where the projected image is superimposed on the peripheral image, the object existing in the peripheral working area (step S6 shown in FIG. 4).

The projected image is calculated (generated) by the display control section 201 and displayed with a gradation of a color in accordance with the distance information (step S7 shown in FIG. 4).

The projected image displayed with the gradation of the color will be further described in detail with reference to FIG. 5. An entire image displayed on the screen of the display device 13 shown in FIG. 5 includes: a peripheral image 30 about a three-dimensional contour of a working site (e.g., an uneven land) that is a peripheral working area; a projected image 40 displayed with a gradation of a color (e.g., a gradation of gray); and an image of the bucket 6. In FIG. 5, the projection direction denoted by the arrow in FIG. 5 is, for example, set in a direction in which the bucket 6 approaches a ground which is an exemplary target position in the working site (the uneven land).

The projected image 40 is displayed with, for example, a gradation of gray in accordance with the distance information concerning a distance between the bucket 6 and a ground lying in an area where the projected image 40 is superimposed on the peripheral image 30, the ground existing in the working site. For instance, the projected image 40 is displayed darker in the color as the distance between the bucket 6 and the ground decreases, that is, as the bucket 6 approaches the ground.

The display control section 201 calculates a position at which the projected image 40 is superimposed on the peripheral image 30 for display based on the projection direction, the shape information of the leading end attachment, the attachment positional information, and the three-dimensional contour information (step S8 shown in FIG. 4). The display control section 201 then superimposes the projected image 40 on the peripheral image 30 and causes the display device 13 to display the superimposed image (step S9 shown in FIG. 4).

Adoption of the above-described configuration in the embodiment makes it easier for an operator to instinctively grasp approaching of a leading end attachment (the bucket 6 in the embodiment) to a target position in a peripheral working area, specifically, an uneven land that is the working target. That is to say, the hydraulic excavator according to the embodiment has a guidance function of further facilitating the working for the operator. Moreover, there is a case where a building structure or an electric wire (an example of the "object") locates obliquely upward and forward of, or above a construction machine (the hydraulic excavator in the embodiment) in the working site. Even in this case, the display device 13 may display the distance information concerning the distance between the building structure or the electric wire and the attachment 15 of the hydraulic excavator. In this case, the operator can easily recognize the distance between the leading end attachment and the object, and avoid a contact between the construction machine (the hydraulic excavator) and the building structure or the electric wire. In this manner, a visual confirmation burden imposed on the operator is reduced as well.

In the embodiment, the projected image 40 is displayed with a gradation of gray in accordance with the distance information in such a manner as to be darker in the color as the distance is decreased. However, the displaying way should not be limited thereto. For instance, the projected image 40 may be displayed with a gradation of another color in place of gray in such a manner as to be darker in the another color as the distance is decreased. Besides, the projected image 40 may be displayed with a number of colors depending on the distance which is shorter or longer. Alternatively, the projected image 40 may be displayed with a mark which makes the distance recognizable as to whether it is shorter or longer.

Furthermore, the adoption of the transparent HUD arranged at the front position in the operating room 10 as the display device 13 eliminates the necessity for the operator to move his/her sight line (point of sight) from the target working site when using the guidance function. This consequently makes it possible to suppress reduction in work efficiency. Furthermore, adopted as the peripheral contour detecting device 14 in the embodiment is the TOF type three-dimensional distance image sensor which can detect the three-dimensional contour of the peripheral working area. Therefore, the peripheral contour detecting device 14 can detect the position of the attachment together with three-dimensional contour of the peripheral working area at the same time. With this configuration in the embodiment, the attachment positional information generation section 200 can generate the attachment positional information based on the information concerning the position of the attachment detected by the peripheral contour detecting device 14. In this configuration, the peripheral contour detecting device 14 performs operations of an attachment state detecting device as well. In other words, the attachment state detecting device constituted by the peripheral contour detecting device 14 detects both the state of the attachment and the three-dimensional contour of the peripheral working area. In this case, the attachment state detecting device 12 shown in FIG. 1 is omittable.

Second Embodiment

Figure 6:
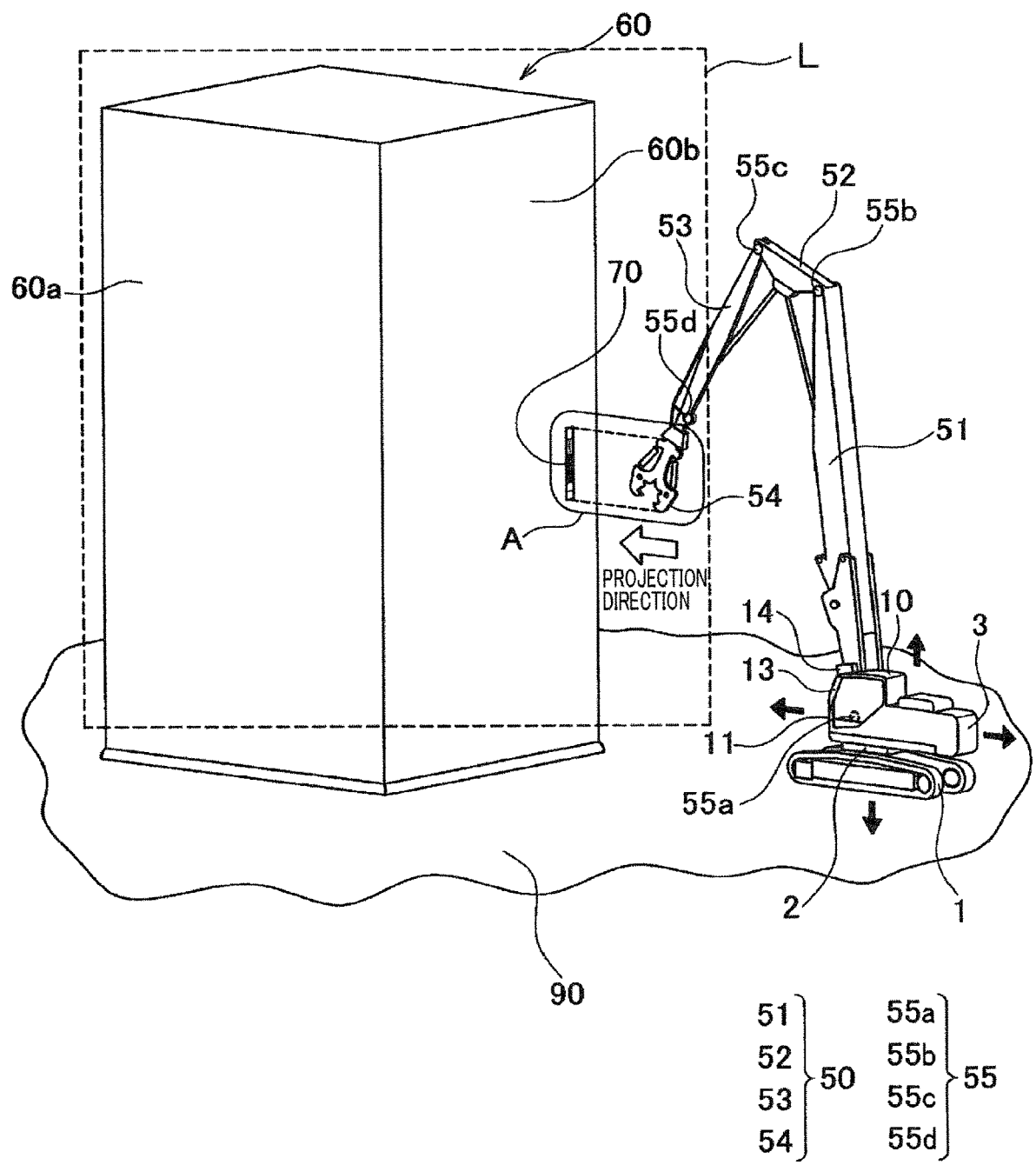
FIG. 6 shows another example of displaying a projected image of a nibbler serving as the leading end attachment with a gradation of a color on a screen of a display device in a nibbler heavy machine serving as a construction machine according to a second embodiment of the present invention.
Figure 7:
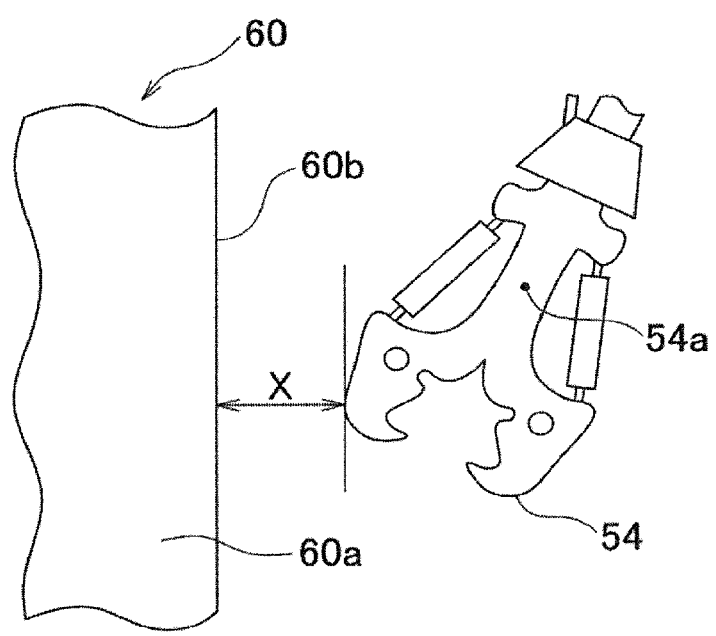
FIG. 7 is an explanatory enlarged view of a portion "A" shown in FIG. 6.
Figure 8:
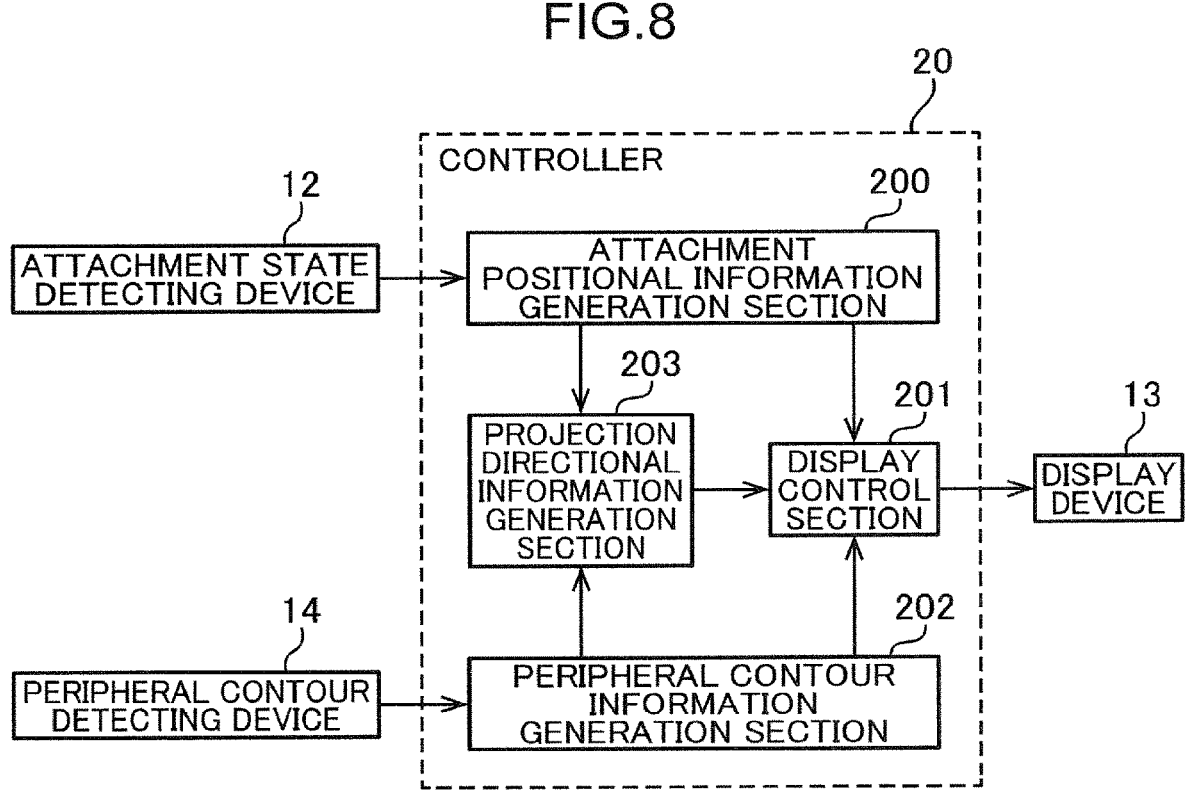
FIG. 8 is a block diagram showing primary functions of the nibbler heavy machine shown in FIG. 6.
Figure 9:
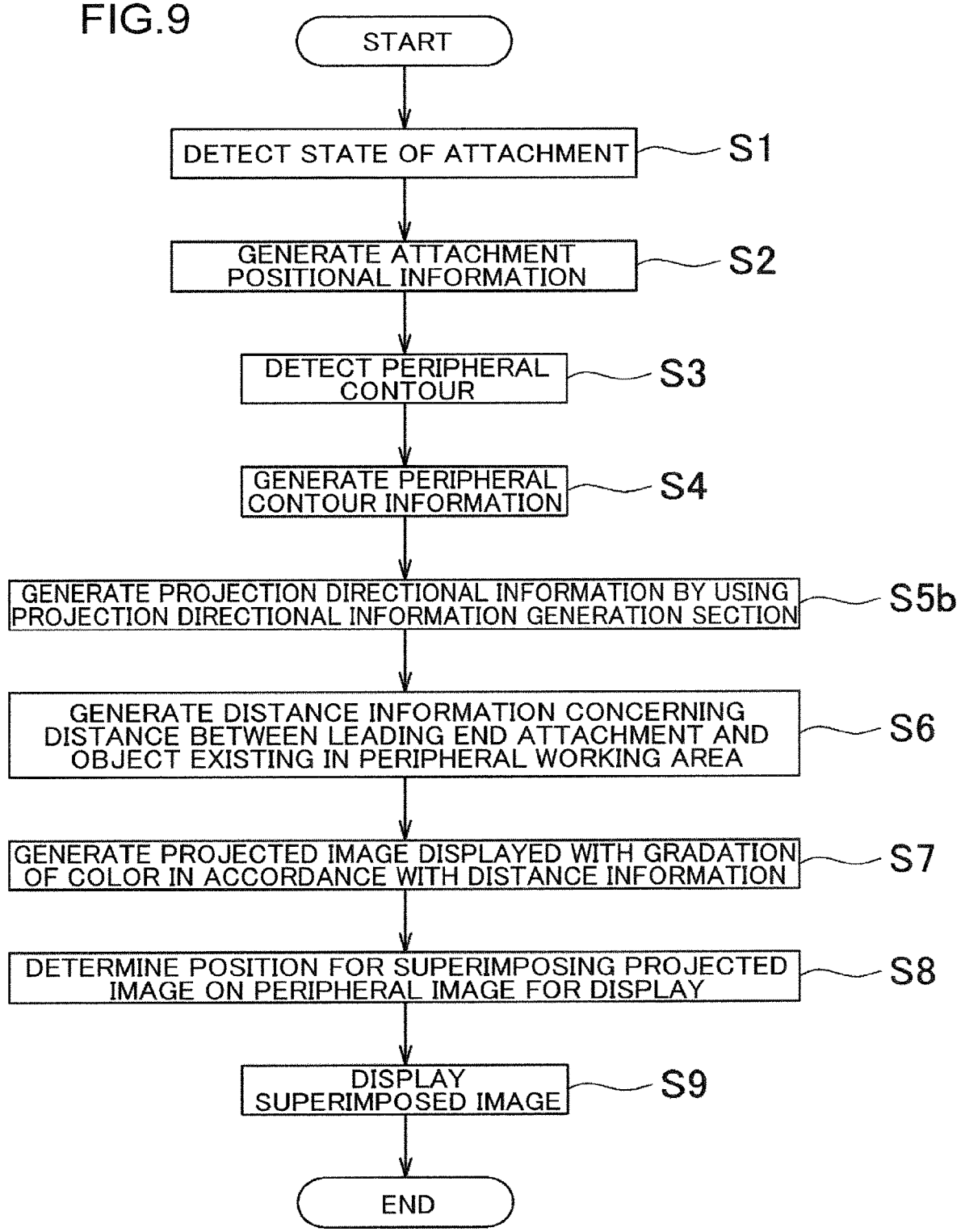
FIG. 9 is a flowchart showing a sequence of a control processing of superimposing the projected image of the leading end attachment (the nibbler) on a peripheral image for display.

FIG. 6 shows another example of displaying a projected image of a nibbler serving as a leading end attachment with a gradation of a color on a screen of a display device in a nibbler heavy machine for building demolition serving as a construction machine according to the second embodiment of the present invention. FIG. 7 is an explanatory enlarged view of a portion "A" shown in FIG. 6. FIG. 8 is a block diagram showing primary functions of the nibbler heavy machine shown in FIG. 6. FIG. 9 is a flowchart showing a sequence of a control processing of superimposing a projected image of the leading end attachment (the nibbler) on a peripheral image for display.

As shown in FIG. 6, the nibbler heavy machine includes a lower traveling body 1, an upper slewing body 3, and an attachment 50 mounted on the upper slewing body 3. The attachment 50 includes a boom 51, a first arm 52, a second arm 53, and a nibbler 54 (which is an example of the leading end attachment).

The nibbler heavy machine further includes an attachment state detecting device 55 which detects a state of the attachment 50. The attachment state detecting device 55 is mounted on, for example, the attachment 50. The attachment state detecting device 55 in the nibbler heavy machine has the same function as the attachment state detecting device 12 shown in FIGS. 1 to 3.

The attachment state detecting device 55 is, for example, a sensor for acquiring information concerning the state of the attachment 50 in the nibbler heavy machine for building demolition. In the embodiment, the attachment state detecting device 55 includes a boom angle sensor 55a for detecting an inclination of the boom 51 with respect to the upper slewing body 3, a first arm angle sensor 55b for detecting an inclination of the first arm 52 with respect to the boom 51, a second arm angle sensor 55c for detecting an inclination of the second arm 53 with respect to the first arm 52, and a nibbler angle sensor 55d for detecting an inclination of the nibbler 54 with respect to the second arm 53.

A display device 13 displays, on a screen thereof, an image of a region enclosed by a dashed line "L" in FIG. 6. The image includes a peripheral image 60 about a three-dimensional contour of the region, a projected image 70, and an image of the nibbler 54. The peripheral image 60 is an image about a three-dimensional contour of a peripheral working area, and includes an image about a building (which is an exemplary "object") standing in a working site that is a working target in this embodiment. In FIG. 6, the nibbler heavy machine for building demolition is arranged on a ground 90, and the building stands on the ground 90 as well.

As shown in FIG. 8, the nibbler heavy machine includes a controller 20 having a projection directional information generation section 203. The projection directional information generation section 203 automatically generates projection directional information based on three-dimensional contour information and attachment positional information (step S5b shown in FIG. 9). The three-dimensional contour information is generated by the peripheral contour information generation section 202 concerning the three-dimensional contour of the peripheral working area, and includes three-dimensional contour of the building. The attachment positional information is generated by an attachment positional information generation section 200, and includes positional information concerning at least a position of the leading end attachment. (e.g., the nibbler 54) of the attachment. Further details of the projection directional information generation section 203 will be described below.

The controller 20 can determine whether an object exists near the leading end attachment (the nibbler 54) based on the three-dimensional contour information (the peripheral contour information) and the attachment positional information. In the specific example shown in FIG. 6, the controller 20 determines that a building wall surface 60b locates near the nibbler 54. The shortest distance between the nibbler 54 and the building wall surface 60b is denoted by "X" as shown in FIG. 7.

The projection directional information generation section 203 stores a reference point 54a of the leading end attachment set in advance. In this embodiment, the reference point 54a is set at, for example, the center of the nibbler 54, but may be set at a position deviating from the center without limiting to the center.

The projection directional information generation section 203 stores a plurality of directions which have been set in advance. Each of the plurality of the directions is defined with respect to a specific portion in the nibbler heavy machine (construction machine) for building demolition, the specific portion being set in advance. The specific portion is, for example, set at any portion of a body of the nibbler heavy machine. For instance, the upper stewing body 3 or the lower traveling body 1 can serve as the body of the nibbler heavy machine. In this embodiment, the plurality of directions includes, for example, a forward direction, a backward direction, an upward direction, and a downward direction denoted by corresponding four black arrows shown in FIG. 6. The projection directional information generation section 203 determines one of the plurality of directions (the frontward, backward, upward, and downward directions) in which the building wall surface 60b and the reference point 54a are oriented with respect to the specific portion based on the attachment positional information and the three-dimensional contour information, and automatically generates projection directional information concerning the determined direction. In the embodiment shown in FIGS. 6 and 7, the projection directional information is information concerning the frontward direction denoted by a white arrow shown in FIG. 6. In adoption of the configuration according to the embodiment, the projection directional information generation section 203 can automatically generate appropriate projection directional information (projection directional information concerning any arbitrary direction) as well as the projection directional information concerning the frontward direction based on the peripheral contour information and the attachment positional information.

Attachment relevant information in the embodiment is calculated based on shape information of the leading end attachment 54, the attachment positional information, and the three-dimensional contour information. The attachment relevant information is information concerning an image obtained by superimposing the peripheral image 60 about the three-dimensional contour of the peripheral working area and the projected image 70 about the nibbler 54 which is projected to the peripheral image 60 in the projection direction. The peripheral image 60 includes an image about the building existing in the peripheral working area. In the embodiment, the projection direction should not be limited to the frontward direction. The projection directional information generation section 203 in the embodiment thus can automatically generate appropriate projection directional information based on the peripheral contour information and the attachment positional information, as well as the information concerning the frontward direction.

The attachment relevant information is information concerning the image obtained by superimposing the projected image 70 of the leading end attachment (the nibbler 54) on the peripheral image 60 about the three-dimensional contour of the peripheral working area. The projected image 70 includes distance information calculated (generated) by the display control section 201 of the controller 20. The distance information is information concerning a distance between the nibbler 54 and an object which lies in an area where the projected image 70 is superimposed on the peripheral image 60, the object existing in the peripheral working area.

The projected image 70 is calculated (generated) by the display control section 201 and displayed with a gradation of a color in accordance with the distance information.

The projected image 70 displayed with the gradation of the color will be further described with reference to FIG. 6. An entire image displayed on the screen of the display device 13 shown in FIG. 6 includes the projected image 70 displayed with the gradation of the color, e.g., a gradation of gray. In FIG. 6, the projection direction (denoted by the white arrow) in FIG. 6 may be set at, for example, a direction in which the nibbler 54 approaches a part of the building wall surface 60b that is a target position of the building existing in the working site.

The projected image 70 is displayed with, for example, the gradation of gray in accordance with the distance information concerning a distance between the nibbler 54 and the building lying in the area where the projected image 70 is superimposed on the peripheral image 60, the building existing in the peripheral working area. For instance, the projected image 70 is displayed darker in the color as the distance between the building and the nibbler 54 decreases, that is, as the nibbler 54 approaches the building.

The display control section 201 calculates a position at which the projected image 70 is superimposed on the peripheral image 60 for display based on the projection direction, the shape information of the leading end attachment, the attachment positional information, and the three-dimensional contour information. The display control section 201 then superimposes the projected image 70 on the peripheral image 30 and causes the display device 13 to display the superimposed image as shown in FIG. 6.

Adoption of the above-described configuration in the embodiment makes it easier for an operator to instinctively grasp approaching of a leading end attachment (the nibbler 54 in the embodiment) to a target position (a part of the wall surface) of, for example, a building existing in a peripheral working area. That is to say, the nibbler heavy machine according to the embodiment has a guidance function of further facilitating the working for the operator. Moreover, the leading end attachment is the nibbler 54 in the embodiment, but should not be limited thereto. In the present invention, the leading end attachment may be any leading end attachment other than the nibbler 54.

Although the projection directional information generation section 203 automatically generates the projection directional information concerning the projection direction based on the peripheral contour information and the attachment positional information in the embodiment, the generation way should not be limited thereto. For example, the projection directional information generation section 203 may be configured to automatically generate the projection directional information for setting the projection direction at a moving direction of a specific portion of the attachment 50, specifically, such as a moving direction of a tip end of the leading end attachment. More specifically, the attachment positional information generation section 200 may be configured to generate attachment positional information at a specific time (e.g., at current time) and attachment positional information at a time before a predetermined period of time from the specific time, calculate the moving direction of the tip end of the leading end attachment (the nibbler 54) based on the attachment positional information, and generate projection directional information concerning the moving direction set as the projection direction. Furthermore, in a case where the movement of the tip end of the leading end attachment (the nibbler 54) is suspended, the projection directional information generation section 203 may generate projection directional information calculated at the time before the predetermined period of time from the specific time (e.g., the current time) as the projection directional information. Moreover, the specific portion of the attachment 50 should not be limited to the tip end of the nibbler 54, and may be set at a tip end of the bucket 6 or a leading end (i.e., the portion denoted by the reference sign 12c shown in FIG. 1) of the arm 5. Here, the projection directional information generation section 203 calculates the moving direction of the set specific portion, and generates projection directional information concerning the moving direction set as the projection direction.

Third Embodiment

Figure 10:
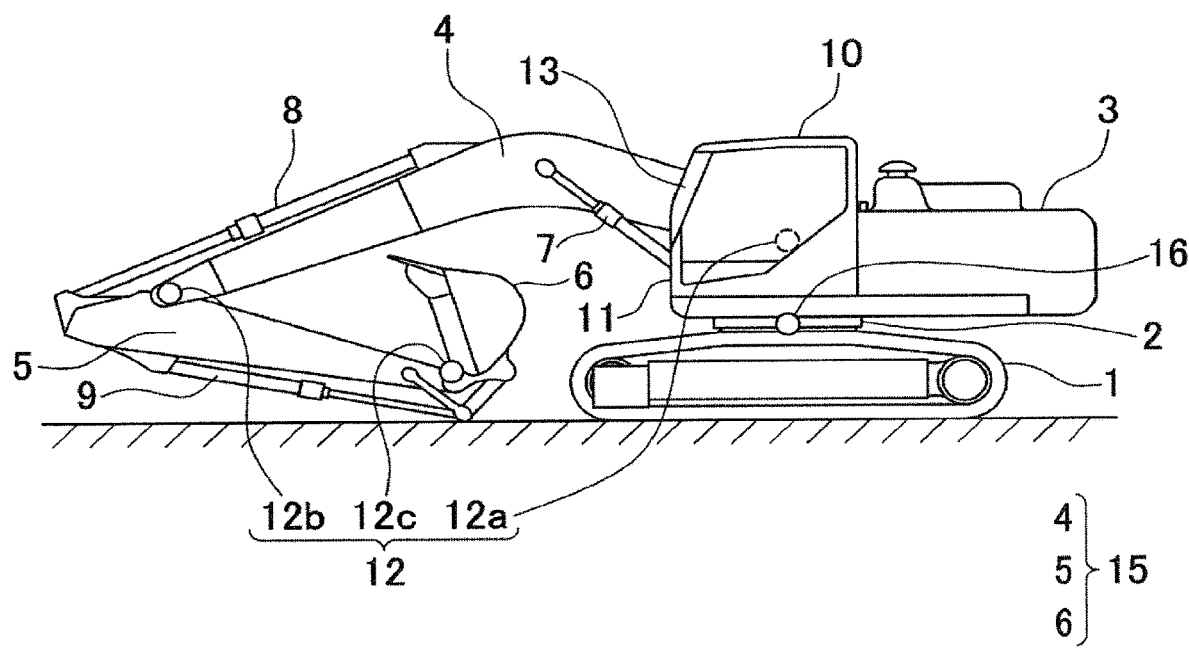
FIG. 10 is a side view of a schematic configuration of a hydraulic excavator serving as a construction machine according to a third embodiment of the present invention.
Figure 11:
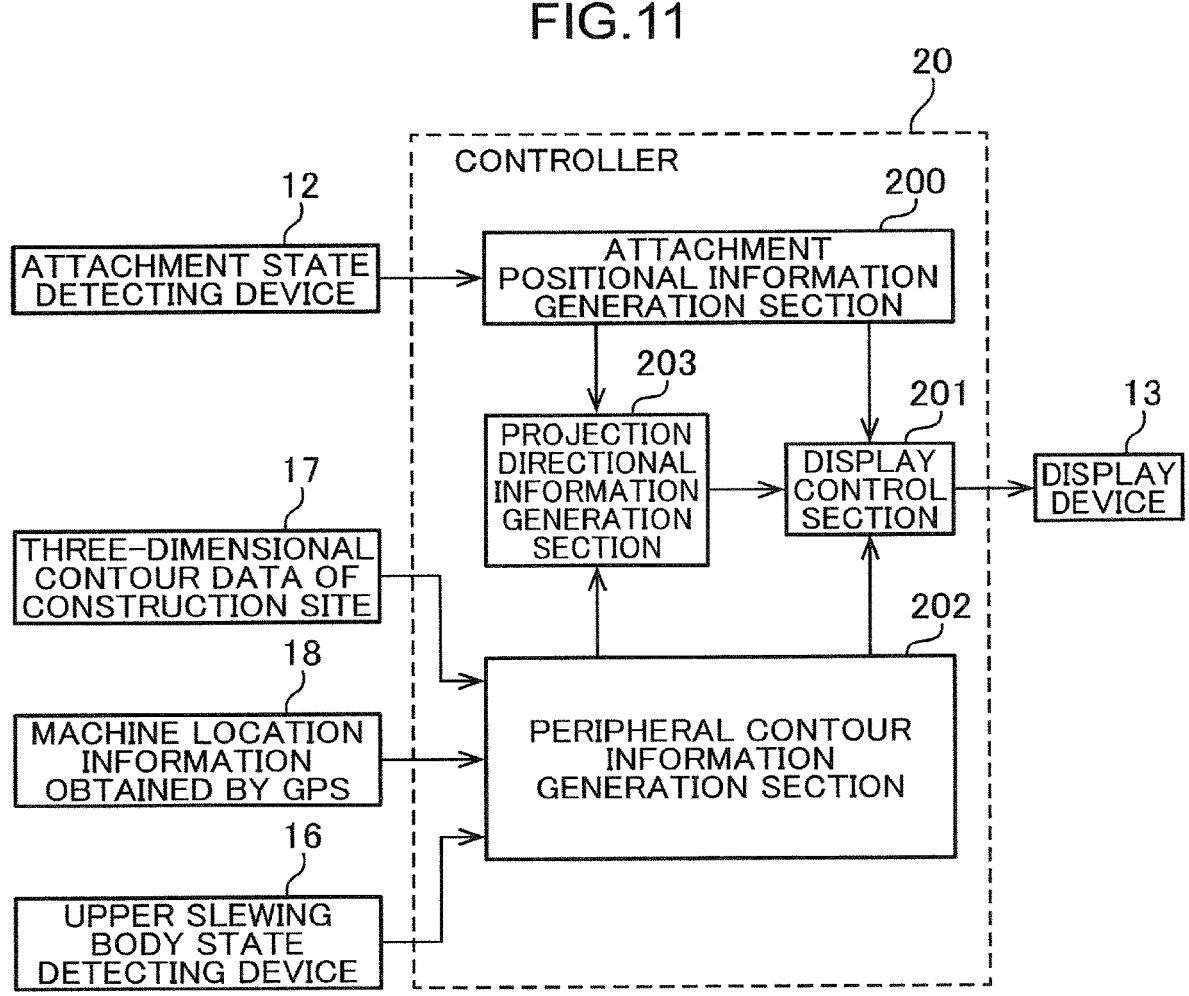
FIG. 11 is a block diagram showing primary functions of the hydraulic excavator shown in FIG. 10.

FIG. 10 is a side view of a schematic configuration of a hydraulic excavator serving as a construction machine according to a third embodiment of the present invention. FIG. 11 is a block diagram showing primary functions of the hydraulic excavator shown in FIG. 10. Omitted in the third embodiment is the peripheral contour detecting device 14 arranged on the top of the operating room 10 according to the first embodiment as shown in FIG. 1. In the third embodiment, three structural elements shown in FIGS. 10 and 11 and described below perform the functions of the peripheral contour detecting device 14 in place thereof. Specifically, the first structural element is a storage device 17 which stores three-dimensional contour information concerning a peripheral working area (three-dimensional contour data of a construction site) as prepared in advance based on an image taken by a photographing device such as a drone. The second structural element is a receiver 18 which can receive data about a satellite positioning, navigation and timing system, such as GPS, GSNN and the like. The receiver 18 can acquire machine location information by receiving the data about the satellite positioning, navigation and timing system. The third structural element is an upper slewing body state detecting device 16. The upper stewing body state detecting device 16 is provided to, for example, a slewing mechanism 2. For instance, the upper slewing body state detecting device 16 includes a direction sensor for detecting a direction in which the upper slewing body 3 is oriented. A peripheral contour information generation section 202 generates three-dimensional contour information (peripheral contour information) concerning a peripheral working area based on the three-dimensional contour data stored in the storage device 17, the machine location information acquired by the receiver 18, and the information concerning the orientation of the upper slewing body 3 detected by the upper slewing body state detecting device 16.

Explained in the embodiments is the example where the storage device 17, the receiver 18, and the upper slewing body state detecting device 16 are used to perform the functions of the peripheral contour detecting device 14. However, elements to be used for the functions should not be limited thereto. For example, the second and third structural elements among the three structural elements may be replaced with another structural element. For example, another receiver which can receive the data about the satellite positioning, navigation and timing system can serve as the another structural element. In this case, the storage device 17, the receiver 18, and the another receiver perform the functions of the peripheral contour detecting device 14 shown in FIG. 1, the storage device 17 storing the three-dimensional contour information concerning the peripheral working area (the three-dimensional contour data of the construction site) as prepared in advance based on the image taken by the photographing device such as the drone, the receiver 18 acquiring the machine location information by receiving the data about the satellite positioning, navigation and timing system, and the another receiver acquiring the information concerning the orientation of the upper slewing body 3 by receiving the data about the satellite positioning, navigation and timing system. In other words, the plurality of receivers each configured to receive the data about the satellite positioning, navigation and timing system can cover the functions of the second and third structural elements.

Fourth Embodiment

Figure 12:
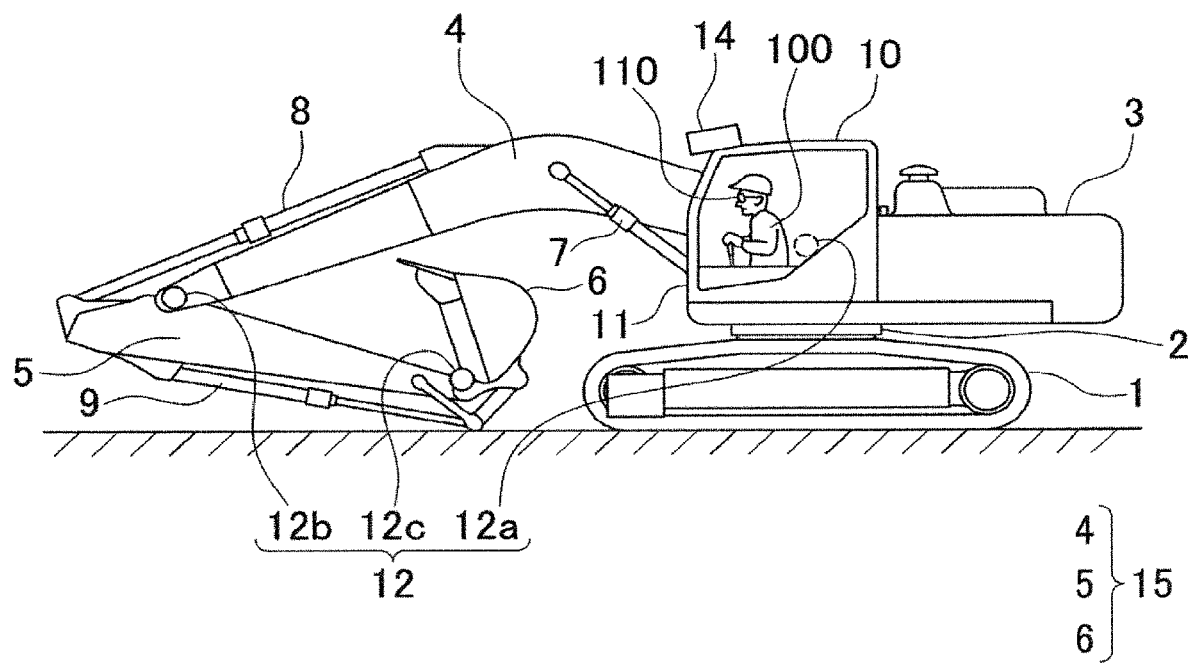
FIG. 12 is a side view of a schematic configuration of a hydraulic excavator serving as a construction machine according to a fourth embodiment of the present invention.

FIG. 12 is a side view of a schematic configuration of a hydraulic excavator serving as a construction machine according to a fourth embodiment of the present invention. A display device in the fourth embodiment differs from the display device 13 arranged at the front position in the operating room 10 in the first embodiment as shown in FIG. 1. The display device 110 in the fourth embodiment includes an eyeglass-type transparent head mounted display (an eyeglass-type transparent HMD) to be worn by an operator 100 in an operating room 10 shown in FIG. 12.

In the same manner as the above-described embodiments, the configuration in the fourth embodiment makes it easier for the operator to instinctively grasp approaching of a leading end attachment (a bucket 6) to a target position in an uneven land of a peripheral working area, i.e., a target working site. The hydraulic excavator according to the embodiment has a guidance function of facilitating the working for the operator. Moreover, the hydraulic excavator according to the fourth embodiment has an advantage that it is possible to eliminate the necessity of providing such a large transparent HUD as the display device 13 adopted in the first embodiment at the front in the operating room 10.

Meanwhile, the transparent HUD serving as the display device 13 described in the first to third embodiments, and the eyeglass-type transparent HMD serving as the display device 110 described in the fourth embodiment are intended for use in the operating room 10. However, the display device in the invention is not indispensably provided in the operating room 10, and may be arranged on an outside of the operating room 10. For instance, the display device may include a remote operation assisting monitor for allowing the operator to remotely operate the hydraulic excavator (the construction machine) by using a remote operating device on an outside of the operating room 10. Details of the remote operation assisting monitor will be described in fifth and sixth embodiments to be described later. The configuration adopted in the embodiments also makes it easier for the operator to instinctively grasp approaching of a leading end attachment to a target position in an uneven land, a building or the like in a peripheral working area, i.e., a target working site. Thus, the hydraulic excavator has a guidance function of facilitating the working for the operator. Furthermore, it is unnecessary for the operator to move his/her sight line from the target working site when using the guidance function. This consequently makes it possible to suppress reduction in work efficiency. Furthermore, in adopting the remote operation assisting monitor, the operator can remotely operate the construction machine from an inside of the building where the remote operation assisting monitor is provided without need to always be present at the actual working site. Accordingly, there is an advantageous effect of increasing the permissible range of places where the operator can actually perform the working.

Fifth Embodiment

Figure 13:
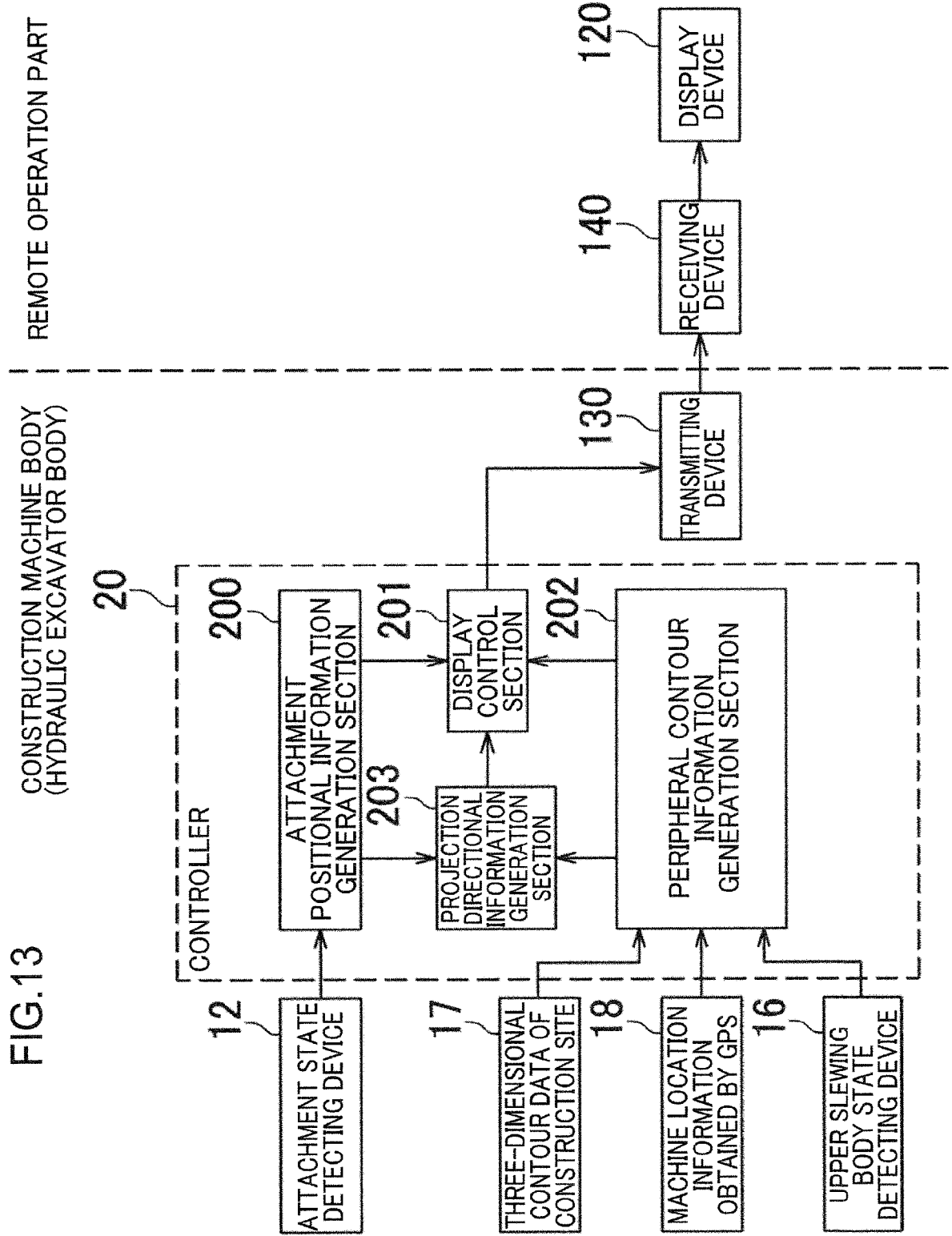
FIG. 13 is a block diagram showing primary functions of a hydraulic excavator serving as a construction machine according to a fifth embodiment of the present invention.

FIG. 13 is a block diagram showing primary functions of a hydraulic excavator serving as a construction machine according to a fifth embodiment of the present invention. The hydraulic excavator according to the fifth embodiment differs from the hydraulic excavator according to the third embodiment in a perspective of having a configuration which enables a remote operation, but is the same as the hydraulic excavator according to the third embodiment in the remaining perspectives. In the fifth embodiment, a display device 120 is not arranged in an operating room 10 of the hydraulic excavator, but is arranged in a remote location on an outside of the operating room 10. The hydraulic excavator according to the fifth embodiment includes a construction machine body and a remote operation part.

As shown in FIG. 13, the construction machine body includes a controller 20, an attachment state detecting device 12, a storage device 17, a receiver 18, an upper slewing body state detecting device 16, and a transmitting device 130. The remote operation part includes the display device 120 and a receiving device 140. The controller 20 and the display device 120 are mechanically separated from each other. The controller 20 and the display device 120 are connected with each other via a wireless communication. The display device 120 in the fifth embodiment has a feature in the remote operation assisting monitor which assists the operator to remotely operate the hydraulic excavator (the construction machine) by using a remote operating device on the outside of the operating room 10. Accordingly, this feature will be focused in detail, and other structural elements will be given the same reference numerals as those for the common elements in the third embodiment without details of description therefor.

As shown in FIG. 13, the display device 120 in the hydraulic excavator according to the fifth embodiment includes the remote operation assisting monitor for the remote operation on the outside of the operating room 10 of the hydraulic excavator (the construction machine). The transmitting device 130 is mounted on the construction machine body (the hydraulic excavator body), and receives an input of a signal output thereto from a display control section 201. The receiving device 140 is provided on the remote operation part, and receives the signal transmitted from the transmitting device 130. The signal received by the receiving device 140 is input to the display device 120. The display device 120 displays an image based on the input signal.

The hydraulic excavator according to the fifth embodiment is configured to transmit information, like the attachment relevant information in the first embodiment, from the transmitting device 130 to the receiving device 140 via a wireless communication. The wireless communication exemplarily includes a communication using an electric wave such as a communication using a mobile phone network, a communication using a wireless LAN and the like.

In the fifth embodiment, the attachment relevant information is generated in the construction machine body of the hydraulic excavator. The attachment relevant information is generated based on attachment positional information and three-dimensional contour information. The attachment relevant information is information concerning an image (an attachment relevant image) obtained by superimposing a peripheral image about the three-dimensional contour of the peripheral working area and a projected image about the leading end attachment which is projected to the peripheral image in a projection direction. The attachment relevant information is transmitted to the display device 120 (the remote operation assisting monitor) on the remote operation part via the transmitting device 130 and the receiving device 140. The display device 120 (the remote operation assisting monitor) displays the received image. In this way, components constituting the display device 120 (the remote operation assisting monitor) can be simplified.

Sixth Embodiment

Figure 14:
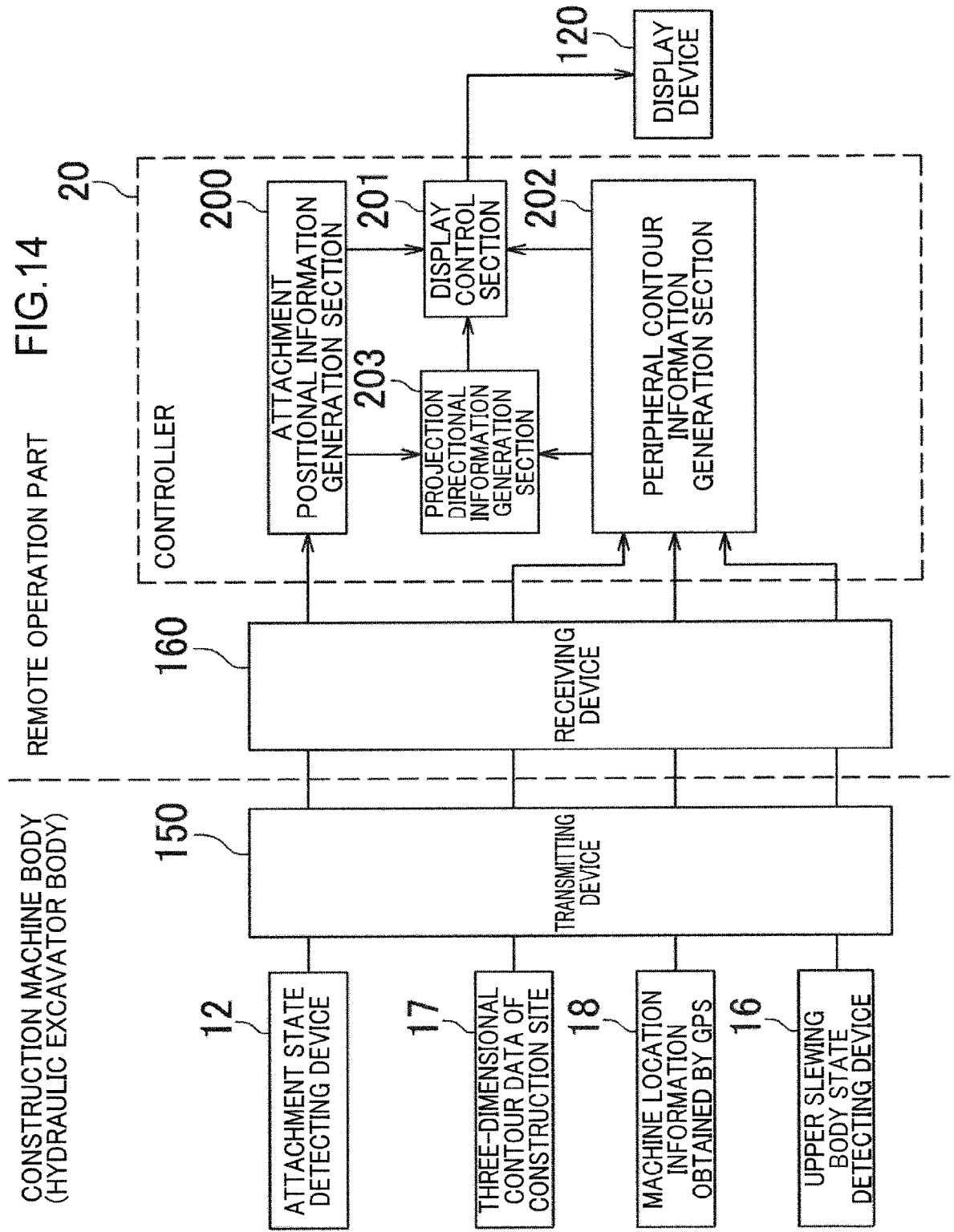
FIG. 14 is a block diagram showing primary functions of a hydraulic excavator serving as a construction machine according to a sixth embodiment of the present invention.

FIG. 14 is a block diagram showing primary functions of a hydraulic excavator serving as construction machine according to a sixth embodiment of the present invention. The hydraulic excavator according to the sixth embodiment differs from the hydraulic excavator according to the fifth embodiment in a perspective of providing a controller 20 not in a construction machine body but on a remote operation part, and is the same as the hydraulic excavator according to the fifth embodiment in the remaining perspectives. In the sixth embodiment, the construction machine body includes: an attachment state detecting device 12; a storage device 17 which stores three-dimensional contour data of a construction site; a receiver 18 which can acquire machine location information by receiving data about a satellite positioning, navigation and timing system such as GPS; an upper slewing body state detecting device 16; and a transmitting device 150. The remote operation part includes a receiving device 160, the controller 20, and a display device 120. A feature lies in that the attachment state detecting device 12, the storage device 17, the receiver 18, and the upper slewing body state detecting device 16 are mechanically separated from the controller 20, but are communicated with the controller 20 via a wireless communication. Accordingly, this feature will be focused in detail, and other structural elements will be given the same reference numerals as those for the common elements in the fifth embodiment without details of description therefor.

As shown in FIG. 14, the transmitting device 150 is mounted on the construction machine body (the hydraulic excavator body). The transmitting device 150 accepts an input of attachment basic data about a state of an attachment detected by the attachment state detecting device 12, and an input of peripheral working area basic data that is a basis for three-dimensional contour information of the peripheral working area. The peripheral working area basic data includes, for example, the three-dimensional contour data of the construction site stored in the storage device 17, the machine location information received by the receiver 18, and information concerning an orientation of an upper slewing body 3 detected by the upper slewing body state detecting device 16. The receiving device 160 is provided on the remote operation part, and receives the attachment basic data and the peripheral working area basic data each transmitted from the transmitting device 150 via a wireless communication.

An attachment positional information generation section 200 generates attachment positional information based on the attachment basic data received by the receiving device 160. A peripheral contour information generation section 202 generates three-dimensional contour information of the peripheral working area based on the peripheral working area basic data received by the receiving device 160. A display control section 201 is configured to generate attachment relevant information based on the attachment positional information and the three-dimensional contour information and control the display device 120 (the remote operation assisting monitor) to display the attachment relevant information. In this way, components of the hydraulic excavator body (the construction machine body) can be simplified.

In adoption of the configuration according to the sixth embodiment, the attachment relevant information is generated on the remote operation part based on the attachment basic data and the peripheral working area basic data each transmitted from the transmitting device 150 mounted on the construction machine body (the hydraulic excavator body). Therefore, it is unnecessary to mount a processing device for generating the image on the hydraulic excavator body (the construction machine body) which is more likely to vibrate and receive an impact than the remote operation part.

In the embodiments 1 to 6, the attachment relevant information is information concerning an image obtained by superimposing the peripheral image about the three-dimensional contour of the peripheral working area and the projected image about the leading end attachment which is projected to the peripheral image in the projection direction, but should not be limited thereto. For example, in addition to the image about the leading end attachment (such as the bucket 6 or the nibbler 54), an image based on shape information concerning at least one member among the boom 4, the arm 5, the boom 51, the first arm 52, and the second arm 53 may be projected to the peripheral image. In other words, information concerning an image obtained by projecting an image about at least the leading end attachment to the peripheral image in the projection direction may be sufficient as the attachment relevant information in the present invention.

The embodiments of the present invention are described heretofore, but are merely described as examples without particularly limiting the present invention. It is the matter of design choice for changes in the details of the configuration. Furthermore, the operations and effects described in the embodiments of the present invention are merely listed as optimal operations and effects attained by the present invention, and thus should not be limited thereto.

The present inventors have diligently studied how to accomplish a construction machine having a guidance function of enabling an operator to easily manipulate an attachment to approach a target position in a peripheral working area (which is a target working site). As a result, the present inventors have found it possible to accomplish this aim by adopting the various configurations described below.

A construction machine according to the present invention is provided with an attachment having a leading end attachment. The construction machine includes: an attachment state detecting device which detects a state of the attachment; an attachment positional information generation section which generates attachment positional information concerning a position of the attachment based on the state of the attachment detected by the attachment state detecting device; a display device; and a display control section which controls the display device to display attachment relevant information generated based on the attachment positional information generated by the attachment positional information generation section and three-dimensional contour information concerning a three-dimensional contour of a peripheral working area around the construction machine. The attachment relevant information is information concerning an image obtained by superimposing a peripheral image about the three-dimensional contour of the peripheral working area and a projected image about the leading end attachment which is projected to the peripheral image in a projection direction set arbitrarily or a projection direction set in accordance with a predetermined condition.

In the construction machine, the attachment relevant information concerning the image obtained by superimposing the projected image on the peripheral image is displayed on the display device. Thus, the operator can perform the operation of moving the leading end attachment closer to the target position in the peripheral working area (which is a target working site) while confirming the attachment relevant information displayed on the display device. According to the present invention, it is possible to provide the construction machine having the guidance function of making it easier for the operator to manipulate the attachment to approach the target position in the peripheral working area.

Specifically, the display control section can calculate a relative position of the leading end attachment to the object existing in the peripheral working area based on the attachment positional information and the three-dimensional contour information. Besides, the display control section can generate the peripheral image based on the three-dimensional contour information, and generate the projected image about the leading end attachment which is projected to the peripheral image in the projection direction based on the relative position. Hence, the display control section can generate an image (a superimposition image) obtained by superimposing the projected image on the peripheral image. Consequently, the display control section can generate the attachment relevant information based on the attachment positional information and the three-dimensional contour information, and control the display device to display the attachment relevant information.

In the construction machine, it is preferable that the projected image is displayed with a gradation of a color or a number of colors in accordance with distance information concerning a distance between the leading end attachment and an object which lies in an area where the projected image is superimposed on the peripheral image, the object existing in the peripheral working area.

In this aspect, the projected image is displayed with the gradation of the color or the number of colors in accordance with the distance information. This makes it easier for the operator to instinctively recognize the distance information based on the gradation of the color or the number of colors.

More specifically, the display control section can calculate a relative position of the leading end attachment to the object existing in the peripheral working area based on the attachment positional information and the three-dimensional contour information as described above. Besides, the display control section can calculate the distance between the leading end attachment and the object lying in the area based on the relative position. In this way, the display control section can generate the projected image displayed with the gradation of the color or the number of colors in accordance with the distance information based on the attachment positional information and the three-dimensional contour information.

Preferably, the construction machine further includes: a peripheral contour detecting device which detects the three-dimensional contour of the peripheral working area; and a peripheral contour information generation section which generates the three-dimensional contour information of the peripheral working area based on the three-dimensional contour of the peripheral working area detected by the peripheral contour detecting device.

In this aspect, the peripheral contour information generation section generates the three-dimensional contour information based on the three-dimensional contour of the peripheral working area detected by the peripheral contour detecting device. Therefore, the construction machine does not need to keep the three-dimensional contour information of the peripheral working area that is the target working site as data in advance before starting the working.

In the construction machine, the peripheral contour detecting device may be configured to detect a shape of the leading end attachment.

In this aspect, even in replacement of the leading end attachment (a first leading end attachment) with another leading end attachment (a second leading end attachment), the construction machine can acquire shape information of the second leading end attachment based on a shape of the second leading end attachment detected by the peripheral contour detecting device. This configuration makes it possible to update the shape information of the leading end attachment to the latest information of the replaced leading end attachment even in the case of the replacement. Additionally, in this aspect, the peripheral contour detecting device detects both the three-dimensional contour of the peripheral working area and the shape of the leading end attachment. This results in suppression in configurational complication of the construction machine.

In the construction machine, the attachment state detecting device may be configured to detect the three-dimensional contour of the peripheral working area.

In this aspect, the attachment state detecting device detects both the state of the attachment and the three-dimensional contour of the peripheral working area. Accordingly, such a device (e.g., the aforementioned peripheral contour detecting device) as to detect the three-dimensional contour of the peripheral working area is omittable.

In the construction machine, the display device may include a transparent head-up display arranged at a front position in an operating room.

In this aspect, it is possible to set a region for displaying the attachment relevant information relatively more freely in the transparent head-up display serving as the display device than in, for example, a liquid crystal display serving as the display device. This achieves suppression in blocking of the operator's sight by the display device.

In the construction machine, the display device may include a transparent head mounted display configured to be worn by an operator in an operating room.

In this aspect, the head mounted display serving as the display device can contribute to the suppression in blocking of the operator's sight more effectively than, for example, a liquid crystal display serving as the display device. Moreover, in this aspect, the head mounted display is transparent, and hence visual information available to the operator includes other information appealing to the operator's sight through the head mounted display without limitation to the information displayed on the head mounted display. Accordingly, the operator can perform, for example, a switching operation of operating a switch in the operating room without blocking of his/her sight by the head mounted display.

The construction machine may further include; a transmitting device mounted on a construction machine body provided with the attachment; and a receiving device provided on a remote operation part for remotely operating the construction machine body on an outside of an operating room of the construction machine body. The display device may include a remote operation assisting monitor arranged in the remote operation part. The remote operation assisting monitor may be configured to display the attachment relevant information in accordance with a signal concerning the attachment relevant information received by the receiving device, the signal being output from the display control section and transmitted from the transmitting device to the receiving device via a wireless communication.

In this aspect, the operator can remotely operate the construction machine on the remote operation part provided in a remote location away from the working site without need to always visit the actual working site.

The construction machine may further include: a transmitting device mounted on a construction machine body provided with the attachment, and configured to accept an input of attachment basic data about the state of the attachment detected by the attachment state detecting device, and an input of peripheral working area basic data that is a basis for the three-dimensional contour information of the peripheral working area; a receiving device provided on a remote operation part for remotely operating the construction machine body on an outside of an operating room of the construction machine body, and configured to receive the attachment basic data and the peripheral working area basic data each transmitted from the transmitting device via a wireless communication; and a peripheral contour information generation section provided on the remote operation part, and configured to generate the three-dimensional contour information of the peripheral working area based on the peripheral working area basic data received by the receiving device. The display device may include a remote operation assisting monitor provided on the remote operation part. The attachment positional information generation section may be provided on the remote operation part and configured to generate the attachment positional information based on the attachment basic data received by the receiving device. The display control section may be provided on the remote operation part, and configured to control the remote operation assisting monitor to display the attachment relevant information.

In this aspect, the operator can remotely operate the construction machine on the remote operation part provided in a remote location away from the working site without need to always visit the actual working site. Additionally, in this aspect, since the attachment positional information generation section and the peripheral contour information generation section are provided on the remoted operation part, the attachment positional information and the three-dimensional contour information are generated on the remote operation part. In other words, in this aspect, it is unnecessary to mount any processing device constituting the attachment positional information generation section and the peripheral contour information generation section on the construction machine which is more likely to vibrate and receive an impact.

The invention claimed is:

1. A construction machine provided with an attachment having a leading end attachment, the construction machine comprising:
    an attachment state detecting device which detects a state of the attachment;
    a display device; and
    a controller, wherein the controller includes
        an attachment positional information generation section which generates attachment positional information concerning a position of the attachment based on the state of the attachment detected by the attachment state detecting device; and
        a display control section which controls the display device to display attachment relevant information generated based on the attachment positional information generated by the attachment positional information generation section and three-dimensional contour information concerning a three-dimensional contour of a peripheral working area around the construction machine, wherein
    the attachment relevant information is information concerning an image obtained by superimposing a peripheral image about the three-dimensional contour of the peripheral working area and a projected image about the leading end attachment which is projected to the peripheral image in a projection direction, and
    the controller generates projection directional information for setting the projection direction based on input information concerning the projection direction input by an operator to a display screen that displays the construction machine with a plurality of arrows surrounding the construction machine on the display screen, the projection direction input by the operator being an arrow of the plurality of arrows that is selected by the operator.

2. A construction machine according to claim 1, wherein the projected image is displayed with a gradation of a color or a number of colors in accordance with distance information concerning a distance between the leading end attachment and an object which lies in an area where the projected image is superimposed on the peripheral image, the object existing in the peripheral working area.

3. A construction machine according to claim 1, further comprising:
    a peripheral contour detecting device which detects the three-dimensional contour of the peripheral working area; and
    a peripheral contour information generation section which generates the three-dimensional contour information of the peripheral working area based on the three-dimensional contour of the peripheral working area detected by the peripheral contour detecting device.

4. A construction machine according to claim 3, wherein the peripheral contour detecting device is configured to detect a shape of the leading end attachment.

5. A construction machine according to claim 1, wherein the attachment state detecting device is configured to detect the three-dimensional contour of the peripheral working area.

6. A construction machine according to claim 1, wherein the display device includes a transparent head-up display arranged at a front position in an operating room.

7. A construction machine according to claim 1, wherein the display device includes a transparent head mounted display configured to be worn by the operator in an operating room.

8. A construction machine according to claim 1, further comprising;
    a transmitting device mounted on a construction machine body provided with the attachment; and
    a receiving device provided on a remote operation part for remotely operating the construction machine body on an outside of an operating room of the construction machine body, wherein
    the display device includes a remote operation assisting monitor arranged in the remote operation part, and
    the remote operation assisting monitor is configured to display the attachment relevant information in accordance with a signal concerning the attachment relevant information received by the receiving device, the signal being output from the display control section and transmitted from the transmitting device to the receiving device via a wireless communication.

9. A construction machine according to claim 1, further comprising:
    a transmitting device mounted on a construction machine body provided with the attachment, and configured to accept an input of attachment basic data about the state of the attachment detected by the attachment state detecting device, and an input of peripheral working area basic data that is a basis for the three-dimensional contour information of the peripheral working area;
    a receiving device provided on a remote operation part for remotely operating the construction machine body on an outside of an operating room of the construction machine body, and configured to receive the attachment basic data and the peripheral working area basic data each transmitted from the transmitting device via a wireless communication; and
    a peripheral contour information generation section provided on the remote operation part, and configured to generate the three-dimensional contour information of the peripheral working area based on the peripheral working area basic data received by the receiving device, wherein the display device includes a remote operation assisting monitor provided on the remote operation part, the attachment positional information generation section is provided on the remote operation part, and configured to generate the attachment positional information based on the attachment basic data received by the receiving device, and the display control section is provided on the remote operation part, and configured to control the remote operation assisting monitor to display the attachment relevant information.

* * * * *